3,279,821
DEVICES FOR MOUNTING THE SADDLE OF A BICYCLE OR ANALOGOUS VEHICLE
Bernard René Mennesson, 190 Avenue de Neuilly, Neuilly-sur-Seine, France
Filed Jan. 29, 1965, Ser. No. 429,078
Claims priority, application France, Feb. 3, 1964, 962,498
5 Claims. (Cl. 280—281)

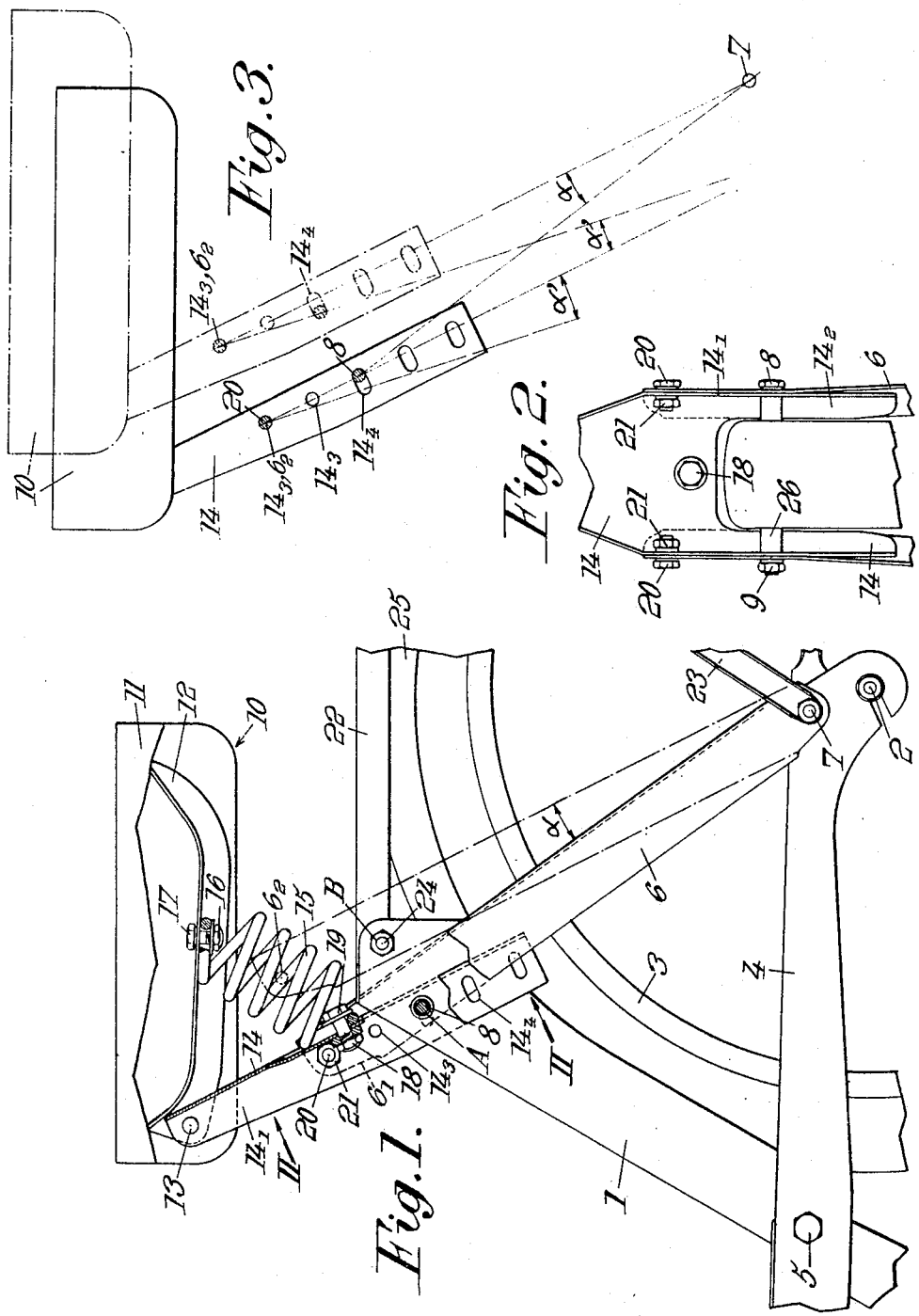

The present invention relates to devices for mounting the saddle on the frame of a bicycle or similar vehicle especially of a motor driven bicycle.

The chief object of the present invention is to provide a device of this kind which is better adapted to meet the requirements of practice than those existing up to now, in particular stronger and cheaper to manufacture.

Such vehicles comprise an oblique saddle pillar extending between the pedal axle and the saddle, a pair of horizontal arms extending in directions substantially at right angles to the vehicle rear axle between the pedal axle and the rear wheel axle, and a pair of oblique arms extending from the top of said pillar to the rear wheel axle, said pair of oblique arms being rigidly assembled at their tops to the top of said pillar through a transverse bolt and at their bottoms to the rear ends of said horizontal arms.

According to the present invention, said oblique arms include, at their tops, extensions projecting frontwardly beyond said pillar, against which extensions the branches of a fork-shaped saddle support are secured both by the above mentioned bolt extending through holes provided in said saddle support and by another bolt or the like, parallel to said first mentioned transverse bolt and extending through registering holes provided in said oblique arm extensions and said saddle support respectively.

A preferred embodiment of the present invention will be hereinafter described with reference to the appended drawings, given merely by way of example, and in which:

FIG. 1 is a side view in elevation, with portions cut away, of a motor bicycle provided with a saddle supporting device according to the present invention;

FIG. 2 is a view on the line II—II of FIG. 1 illustrating a detail of this device;

FIG. 3 is an explanatory diagram showing how adjustment may be performed.

It should be reminded that the saddles of motor bicycles must be adjustable first vertically so as to permit of accommodating the bicycle to the size of the cyclist using it and secondly in inclination so as to improve comfort.

For this purpose, such saddles are generally mounted, in a manner adjustable in inclination, on tubes slidable in guiding sheaths.

Such an arrangement involves some drawbacks, in particular a lack of a directional stability of the saddle which tends to pivot about the axis of the tube, which lack of stability can be obviated only by making use of strong holding means, which are delicate and expansive. Further difficulties are the adjustable assembly of the saddle on the tube and of the sheath with respect to the remainder of the frame, the cost and the lack of solidity of the tubular elements.

The fixation of the sheath on the remainder of the frame is particularly delicate in the preferred case where the saddle pillar stem, instead of consisting of this sheath, consists of an iron sheet element bent into a U turning its concavity toward the rear, the sides of this element playing, in addition to their structural section, that of a mudguard for the rear wheel.

In order to obviate these drawbacks, according to the present invention, said tubular elements are replaced by members which overlap one another without being capable of undergoing relative horizontal angular displacement, such members being in particular made of iron sheets bent and provided with holes and assembled together by means of bolts, the saddle support thus constituted forming an extension toward the front and in the upward direction of the oblique arms which connect it to the rear wheel axle.

In the embodiment illustrated by the drawings the saddle pillar stem 1 consists of an iron sheet bent so that a horizontal section thereof is in the form of a U having its concavity turned toward the rear. The axle 2 of the rear wheel 3 is connected to this pillar stem 1 on the one hand by a pair of horizontal arms 4 fixed to said pillar stem 1 through nuts 5 and on the other hand by a pair of oblique arms 6 the lower ends of which are fixed at 7 to arms 4 close to axle 2 and the upper ends of which are fixed to the rear upper end of pillar stem 1 through a system including a transverse bolt or pin 8 and nuts 9.

Each of the arms 4 and 6 is advantageously made of an L-shaped section of a relatively thin iron sheath (for instance of a thickness of 1.5 mm.).

The upper ends of oblique arms 6 form extensions $6_1$ projecting beyond fixation means 8–9, and said extensions $6_1$ are provided respectively, with circular holes $6_2$ in line with each other.

Saddle 10 is for instance made of a thick and flexible sheet 11 of leather, rubber or another suitable material, resting upon a multiplicity of helical springs (not visible in the drawings) stretched in fan-like manner on a rigid frame 12.

The front end of said saddle is pivotally mounted about a horizontal pin 13 carried by a support 14 fixed on arms 6. The angular movements of the saddle about this pin 13 with respect to a substantially horizontal position are resiliently absorbed by a strong helical spring 15 interposed between frame 12 (to which it is secured by a bolt 16 and a nut 17) and support 14 (to which it is secured by a bolt 18 and a nut 19).

Support 14 comprises a relatively thick metal plate (for instance of a thickness of 2 mm.) disposed substantially in line with the plane passing through oblique arms 6. This plate 14 includes two flanges $14_1$ perpendicular thereto and two branches $14_2$ (FIG. 2) extending downwardly on either side of pillar 1. Flanges $14_1$ are provided with at least one pair of curcular holes $14_3$ respectively located in line with each other and with at least one pair of elongated holes $14_4$ also located opposite each other.

Support 14 (and therefore saddle 10) is secured to the bicycle frame by means, on the one hand, of bolt 8 and nut 9 extending not only through pillar 1 and oblique arms 6 but also through the elongated holes $14_4$ provided in support 14 and, on the other hand, of two bolts 20, cooperating with nuts 21, said bolts extending, through the holes $6_2$ of oblique arms 6 and circular holes $14_3$ provided in support 14.

Each elongated hole $14_4$ is in the form of a circular arc the center of which is the center of the hole $14_3$ associated therewith, so that the inclination of support 14 (and therefore of saddle 10) can be adjusted by angular displacements of said support 14 about bolts 20.

Preferably, as shown, each of the flanges $14_1$ is provided with several circular holes $14_3$ each cooperating with a corresponding elongated hole $14_4$; whereby the saddle can be given several positions corresponding to different heights, respectively, but for which the inclination is the same. In the embodiment illustrated by the drawings there are three elongated holes $14_4$ and two circular holes $14_3$, the third of said circular holes consisting of a portion of the top elongated hole 14₄. Thus the saddle can be fixed at any of three different heights.

In the embodiment illustrated by the drawings, means are provided for giving oblique arms 6 either of two different positions, whereby the saddle can also be given two different positions, to wit a front position, illustrated in solid lines in FIG. 3, and a rear position illustrated in dot-and-dash lines in FIG. 3.

For this purpose, pillar 1 is provided with two holes or housings each adapted to accommodate bolt 8. These two holes (indicated by reference characters A and B in FIG. 1, where they respectively accommodate bolt 8 and an analogous bolt 24) are of course located at the same distance from axis 7. Thus the two positions of assembly of arms 6 on pillar 1 can be deduced from each other by a mere angular displacement $\alpha$ about this axis 7.

In this case, the length of every elongated hole 14₄ is such that the maximum angular displacement $\alpha'$ (FIG. 3) possible for bolt 8 about the axis of the corresponding hole 14₃ is at least equal to the above mentioned angle $\alpha$.

If angles $\alpha'$ and $\alpha$ are equal to each other (case of FIG. 3) it suffices, in order to compensate for the variation of inclination of arms 6 corresponding to the insertion of bolt 8 from one of the positions A and B to the other, to pivot support 14 about bolts 20 so as to bring bolt 8 from one end of elongated hole 14₄ to the other end.

Thus, the best possible inclination of the saddle about spindle 13 can be determined once and for all and can be maintained when adjustments of position are performed.

Particular advantages of the device above described are that it is strong, cheap to manufacture and not easily brought out of position. In particular misadjustments in the horizontal direction are wholly excluded, whereas they were frequent in prior fixation devices.

The drawings further show a luggage carrier 22 the rear end of which is supported by two oblique arms 23 and through the front end of which bolt 24 extends.

The bicycle may also include a mudguard 25 supported by the lugage carrier, and spacing rings 26 surrounding bolt 8 and located between flanges 14₁ and pillar 1.

Of course, instead of providing for only two different positions of oblique arms 6, the device might be arranged to provide for a multiplicity of said positions by making use, for holding bolt 8, of slots extending between housings A and B along circular arcs having their centers on axis 7.

Instead of using a thick plate for constituting element 14 use might be made of a molded fork.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What I claim is:

1. In a vehicle comprising a rear wheel axle, the combination of a rearwardly and upwardly oblique pillar,
   a pair of horizontal arms extending rearwardly from the lower portion of said pillar toward the vehicle rear wheel axle,
   a pair of frontwardly and upwardly oblique arms secured at their rear lower ends to the rear ends of said horizontal arms respectively,
   said pillar and said arms having a common plane of symmetry parallel to the fore-and-aft direction of said vehicle,
   the top ends of said oblique arms forming extensions beyond said pillar,
   a fork-shaped support having downward branches applied against said extensions, respectively,
   the top end of said pillar, said oblique arm extensions and said support being provided with respective registering holes located on a line transverse to said plane of symmetry,
   a fixation pin extending through said holes,
   said oblique arm extensions and said support being provided with other registering holes,
   a fixation pin extending through said last mentioned holes, and
   a saddle carried by said support.

2. In a vehicle comprising a rear wheel axle, the combination of a rearwardly and upwardly oblique pillar,
   a pair of horizontal arms extending rearwardly from the lower portion of said pillar toward the vehicle rear wheel axle,
   a pair of frontwardly and upwardly oblique arms secured at their rear lower ends to the rear ends of said horizontal arms respectively,
   said pillar and said arms having a common plane of symmetry parallel to the fore-and-aft direction of said vehicle,
   the top ends of said oblique arms forming flat extensions thereof beyond said pillar, said flat extensions being parallel to said plane of symmetry,
   a fork-shaped support including a plate transverse to said plane of symmetry and, on either side of said plane, side flanges integral with said plate,
   said fork-shaped support having downward branches the side flanges of which are applied against said flat extensions, respectively,
   said oblique arm extensions and said support flanges being provided with respective circular holes located on the same line transverse to said plane of symmetry,
   a first fixation pin extending through said holes,
   the top end of said pillar, said oblique arm extensions and said support flanges being provided with respective holes located on another line transverse to said plane of symmetry,
   a second fixation pin extending through said last mentioned holes,
   a saddle,
   a rigid frame for said saddle,
   the front end of said saddle frame and the top ends of the flanges of said fork-shaped support being provided with coaxial holes,
   a pin extending through said last mentioned holes for pivotally connecting said saddle with said fork-shaped support, and
   a spring interposed between the rear portion of said saddle and said support for resiliently holding said saddle in position on said support.

3. A device according to claim 2 wherein said oblique arms are pivotally mounted about the rear ends of said horizontal arms and said pillar is provided with two sets of holes either of which is adapted to cooperate with the second mentioned holes of said oblique arms, whereby said oblique arms can be secured in either of two distinct positions with respect to said pillar.

4. In a vehicle comprising a rear wheel axle, the combination of a rearwardly and upwardly oblique pillar,
   a pair of horizontal arms extending rearwardly from the lower portion of said pillar toward the vehicle rear wheel axle,
   a pair of frontwardly and upwardly oblique arms secured at their rear lower ends to the rear ends of said horizontal arms respectively,
   said pillar and said arms having a common plane of symmetry parallel to the fore-and-aft direction of said vehicle,
   the top ends of said oblique arms forming flat extensions thereof beyond said pillar, said flat extensions being parallel to said plane of symmetry, a fork-shaped support including a plate transverse to said plane of symmetry and, on either side of said plane, side flanges integral with said plate, said fork-shaped support having downward branches the side flanges of which are applied against said flat extensions, respectively, said oblique arm extensions and said support flanges being provided with respective circular holes located on the same line transverse to said plane of symmetry, a first fixation pin extending through said holes, the top end of said pillar, said oblique arm extensions, and said support flanges being provided with respective holes located on another line transverse to said plane of symmetry, said last mentioned holes in said support flanges being elongated and in the form of circular arcs having their respective centers on the axis of said first fixation pin, a second fixation pin extending through said last mentioned holes, a saddle, a rigid frame for said saddle, the front end of said saddle frame and the top ends of the flanges of said fork-shaped support being provided with coaxial holes, a pin extending through said last mentioned holes for pivotally connecting said saddle with said fork-shaped support, and a spring interposed between the rear portion of said saddle and said support for resiliently holding said saddle in position on said support.

5. A device according to claim 4 wherein each of said flanges comprises at least two holes of elongated shape located at different respective levels and at least two first mentioned holes, respectively, whereby the saddle can be adjusted at two different heights with respect to said oblique arms.

References Cited by the Examiner

UNITED STATES PATENTS 2,770,479  11/1956  Hilber _____ 280—281 X

FOREIGN PATENTS 1,159,348  2/1958  France.

KENNETH H. BETTS, *Primary Examiner.*